United States Patent [19]
Karpa

[11] Patent Number: 4,466,501
[45] Date of Patent: Aug. 21, 1984

[54] VEHICLE WEIGHING DEVICE

[76] Inventor: Michael J. Karpa, 45 E. Bend Ave. N., Hamilton, Ontario, Canada, L8L 7E1

[21] Appl. No.: 376,714

[22] Filed: May 10, 1982

[30] Foreign Application Priority Data

Sep. 29, 1981 [CA] Canada .................................. 386913

[51] Int. Cl.³ ............................................ G01G 19/02
[52] U.S. Cl. ..................................... 177/134; 177/255
[58] Field of Search ............... 177/132, 133, 134, 135, 177/211, 255

[56] References Cited

U.S. PATENT DOCUMENTS

| | | | |
|---|---|---|---|
| 3,736,998 | 6/1973 | Flinth | 177/255 X |
| 3,770,068 | 11/1973 | Ahl | 177/134 |
| 4,280,576 | 7/1981 | Smith | 177/134 X |

FOREIGN PATENT DOCUMENTS 974549 9/1975 Canada .
2076977 12/1981 United Kingdom .

Primary Examiner—Joseph W. Hartary

[57] ABSTRACT

The vehicular weighing device of the present invention comprises a plurality of longitudinally arranged concrete panels prestressed in longitudinal and lateral directions. The individual panels are normally square or rectangular in shape. The panels have a plurality of continuous longitudinal cables therethrough connecting the panels and causing longitudinal prestressing therein. The panels have a pivot means at their juncture, allowing rotational movement along the hinge or pivot means. This arrangement allows shear force transfer, but no bending moment transfer, across the hinge or pivot means.

6 Claims, 6 Drawing Figures

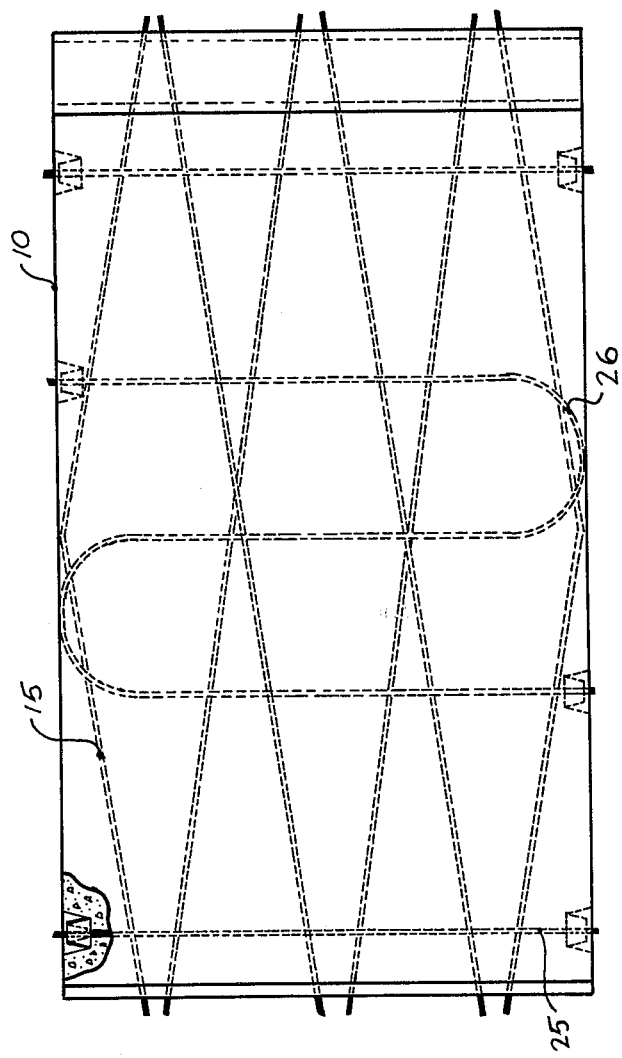
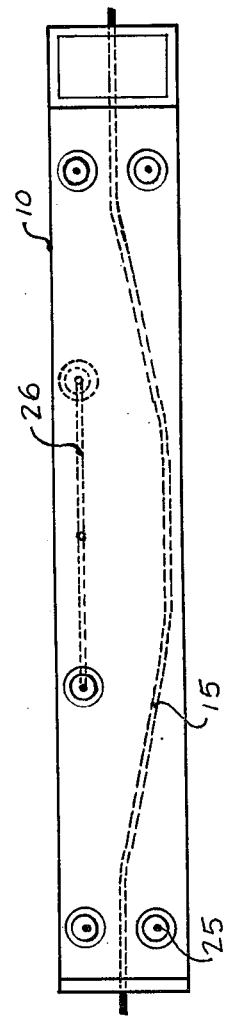
FIG. 4
FIG. 5

VEHICLE WEIGHING DEVICE

BACKGROUND OF THE INVENTION

The present invention relates to a concrete low height, or profile, weighbridge deck such as used in above-ground truck scales and is a method of construction of such weighbridge decks.

It is well known that weighing of vehicles, such as trucks, can be accomplished by means of a platform, or deck, positioned on top of structural beams which are, in turn, mounted on load cells and located in a pit. Typically, the required pit is about 5 feet deep, requiring heavy concrete sides, end walls and footings. Not only is there a high initial cost associated with such a pit, but such pits present maintenance problems, such as drainage and cleaning out of debris which accumulates in somewhat inaccessible places along the pit bottom.

Attempts have been made to devise weighbridges with a low deck height (about 10–12 inches) which can be mounted above grade or in an accessible depression slightly below the surface. Of the two types of low profile truck scales on the market at present, the more common approach is to have beams or girders on each side and undersling a shallow deck in between to receive the vehicle to be weighed. Although such arrangements require few supports (hence, few expensive load cells) they inherently require more material and fabrication operations, which results in a weighing device which is considerably more expensive than a conventional in-pit scale arrangement. Another approach is to construct an all-steel deck, or slab, using a large number of supports. Such arrangements are costly, as they involve the extensive handling and fabrication of heavy steel weldments and a large number of expensive load cells and supports.

The present invention provides a low profile truck scale which utilizes predominantly inexpensive normal concrete with a minimum of handling and fabrication to produce a rugged accurate and substantially maintenance-free truck scale. By way of background, it should be noted that research investigators looking into the design of concrete slabs for highway bridges recently have found that a concrete slab prestressed in both horizontal directions results in a durable, maintenance-free structural component. It has been further found that, if the slab is partially cored out, or waffled, from the bottom, it retains its maintenance-free performance with an efficient use of materials. However, the adaptability of such prestressed slabs to a low profile vehicle scale of the size required for long trucks presents some major problems. For example, the length of the required deck is too great to have a workable slab height. This requires the deck to be divided into several panels with intermediate supports. In such arrangements, a large number of relatively short cables would need to be prestressed. It is difficult to field tension short cables with any degree of accuracy; great care and special techniques would need to be employed. An additional problem with such arrangements is that it is difficult to design and construct the intermediate supports. Such support configurations are necessarily complex, because they must transfer the load from each panel end to the load cells without being affected by factors, such as deflections, camber and thermal expansion.

GENERAL DESCRIPTION OF THE INVENTION

A concrete weighbridge according to the present invention overcomes such difficulties by eliminating all or substantially all of the short prestressing cables, thereby reducing the number of stressing operations. The present device provides simple intermediate supports and does not require movement or handling of the deck slabs for cable stressing accessibility.

The present invention relates to a vehicular weighing device, or weighbridge, which consists of at least two concrete slab panels which have a plurality of continuous prestressing cables passing longitudinally therethrough. The panels are joined by hinge means. Each corner of the weighbridge and each corner of the hinged joints are mounted on load cells, which are calibrated to read the weight or load on the weighbridge.

The vehicular weighing device of the present invention comprises a plurality of longitudinally arranged concrete panels prestressed in longitudinal and lateral directions. The individual panels are normally square or rectangular in shape. The panels have a plurality of continuous longitudinal cables therethrough connecting the panels and causing longitudinal prestressing therein. The panels have a pivot means at their juncture, allowing rotational movement along the hinge or pivot means. This arrangement allows shear force transfer, but no bending moment transfer, across the hinge or pivot means.

DETAILED DESCRIPTION OF THE INVENTION

Referring now to the drawings, wherein like reference numbers indicate like parts in the various views:

FIG. 4 is a plan view of a weighbridge slab having longitudinal prestressing cables and equipped with supplemental lateral prestressing cables.

FIG. 5 is a side elevation view of the slab shown in FIG. 4.

Figures 1, 2:
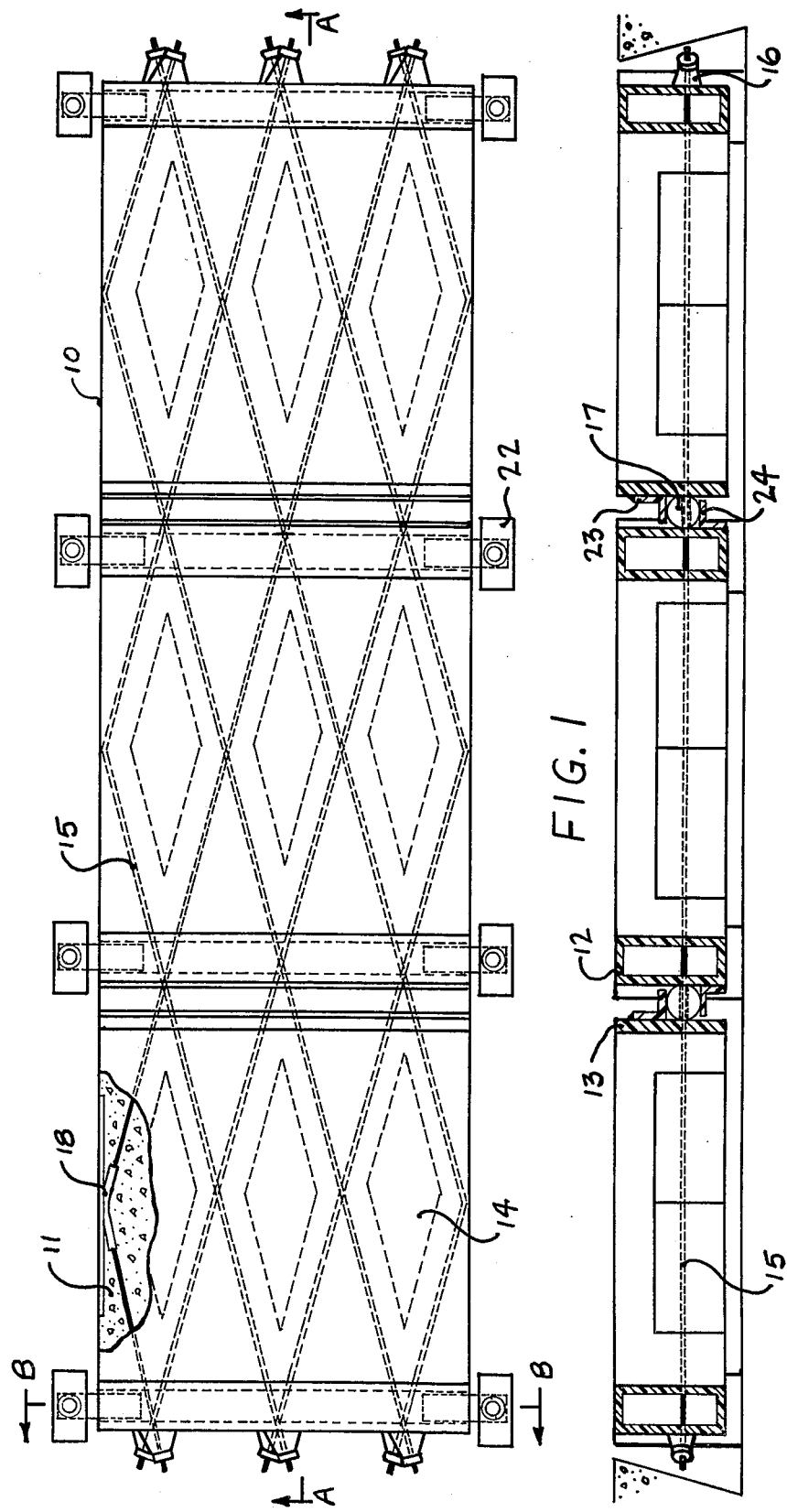
FIG. 1 is a plan view of the weighbridge slab having three separate concrete panels.
FIG. 2 is a sectional view along line A—A of FIG. 1.
Figure 3:
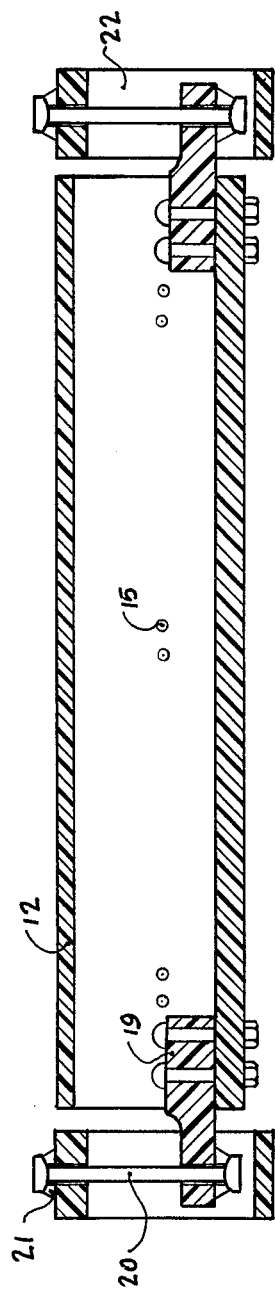
FIG. 3 is a sectional view along line B—B of FIG. 1.

FIG. 1 shows a weighbridge device according to the present invention having a deck which consists of a plurality of concrete panels, such as 10. The panels are suitably poured on site, using normal ready-mix concrete 11. The form for pouring the panels is conveniently provided by slab support elements 12, end reaction elements 13, with the addition of wooden planks, for example 2"×12", positioned along the slab sides. The base of the form may suitably be a simple patio-type ground hard surface. In a preferred embodiment, the slab panels have pockets 14 cored from the bottom, providing a waffle construction. Prior to the pouring of concrete in the arrangement shown in FIG. 1, a skewed array of continuous tensioning or stressing cables 15, generally between about ¼ and ¾ inch in diameter, is suitably arranged in the lower half of the proposed slab cross section, as illustrated. The cables are suitably positioned in grout-filled metal ducts or grease-filled plastic tubes as is normal post-tensioning practice and are anchored suitably with wedges, such as 16, at each end. The cables pass through intermediate supports in simple clearance holes. A pivot means, or shaft, comprised of a round steel bar 17 is positioned between the slab panels to transfer the prestressing force between slabs. The shaft provides a hinge to permit deflection, or camber movement, of the panel elements at their point of juncture. At points where the stressing cables meet the panel sides, they pass through a deflector unit 18, which is comprised of a pipe/plate weldment serving the function of transferring the cable reaction force into lateral concrete prestress. After the concrete in the panel has set up, the cables are tensioned to their normal working stress levels, usually between about 150,000 and 200,000 psi. The weighbridge unit is comprised of a plurality of longitudinally arranged slab panels connected by the longitudinal cables with intermediate pivot points allowing rotational movement of the panels at their point of juncture. The panels are prestressed in two directions with higher stress levels in the lower portion. Panel support elements 12 are suitably fabricated of a box section steel beam and have a load cell 19 attached at each end. When the scale is finally raised 2 or 3 inches into its working position, the dead and live loads are supported by suspension rods 20 which pass through the load cells, such as 19. Suspension rods 20 are mounted in spherical seat 21, which permits panel movement, such as thermal expansion, without affecting the accurate force transfer to the load cells. The top portion of the suspension rods are, in turn, supported by welded brackets 22, which rest on the foundation. In operation, the load or weight on the weighbridge is transferred either directly to a load cell, such as 19, through panel load elements 12 or through upper bracket 23 shaft 17 and lower bracket 24 to load cells, such as 19. The load is read from load cells, suitably in a hearby scalehouse, by known electrical or electronic means.

Where the scale is long and relatively narrow, the embodiment shown in FIGS. 4 and 5 is preferably used. In this embodiment, the longitudinal cables extend lengthwise of the panel arrangement, and supplemental lateral prestressing cables, or rods, are utilized to achieve a higher prestress level than would be possible by only weaving the cables from side to side. Looking now at FIGS. 4 and 5, lateral prestressing cables, such as 25, are located near the panel ends, and a multiple crossing cable 26 is positioned in the top center portion of the panel. It is to be pointed out that the stressing accuracy of such relatively short cables is not precise and that the main purpose and function of the stressing by cables 25 and 26 is to prevent the concrete panel from deteriorating by keeping the panel in an uncracked state. Lateral rods, not shown, may suitably be used in place of, or in combination with, lateral cables 25 and 26.

Figure 6:
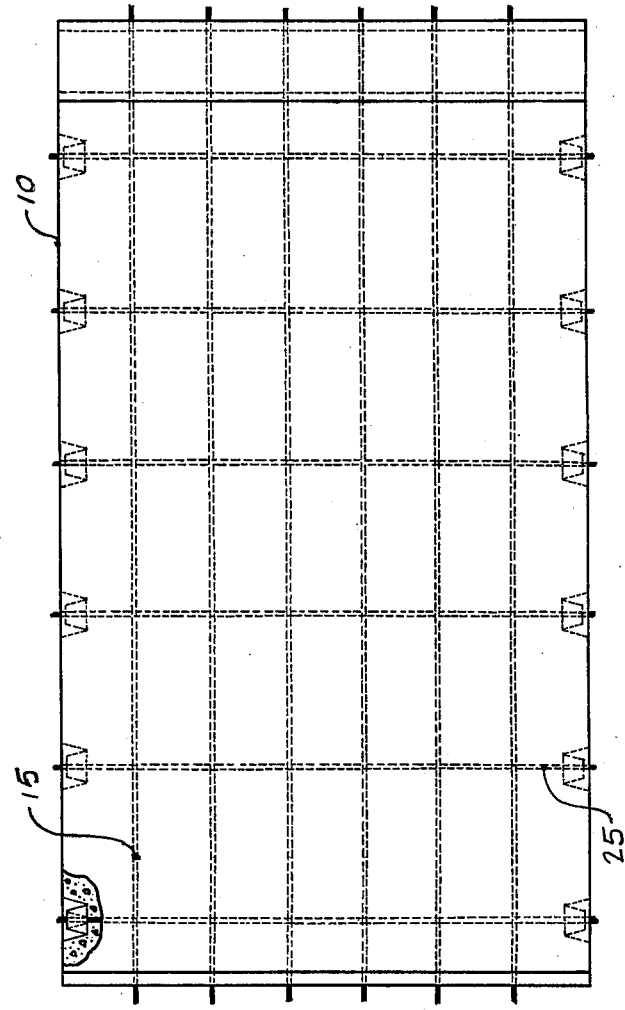
FIG. 6 is a plan view of an alternative method of construction utilizing straight cables.

FIG. 6 shows an alternative mode wherein the longitudinal cables 15 are arranged in substantially straight line. In this mode, a larger number of lateral cables 25 and 26 would be required than in the embodiment shown in FIGS. 1 through 5.

Although the invention has been described with reference to a specific embodiment, it will be appreciated that a number of details may be altered without losing the basic features of the concept. The cables may be draped or lowered at each panel center area to develop a resisting negative moment more closely matching the applied moment due to live loading. Because the pivot points have little rotation, a hardened steel bar may be utilized as a hinge instead of more costly shafting. The cables may pass above or below the hinge, eliminating the drilling of holes. The hinge may be in short increments, and the cable may pass between the increments. The load cells may be positioned to react against a hardened compression pin mounted directly on the foundation, or may be foundation-mounted instead of being located on the weighbridge itself as shown.

What is claimed is:

1. A vehicular weighing device comprising:
   a. a plurality of longitudinally arranged concrete panels prestressed in longitudinal and lateral direction,
   b. said panels having a plurality of continuous, longitudinal prestressing cables therethrough connecting said panels and causing said panels to be prestressed in a longitudinal direction,
   c. a pivot means at the juncture of said panels allowing rotational movement of the panels at said juncture, and
   d. said panels mounted on a plurality of load cells for determining the weight of an object placed upon said panels.

2. The weighing device of claim 1 wherein the panels are prestressed in a lateral direction by the addition of lateral cables through said panels.

3. The weighing device of claim 1 wherein the panels are prestressed in a lateral direction by the addition of lateral rods through the panels.

4. The weighing device of claim 1 wherein the panel arrangement has a plurality of continuous cables extending longitudinally therethrough, said cables arranged to extend from side to side of said panel arrangement to provide lateral prestressing.

5. The weighing device of claim 1 wherein additional lateral prestressing in said panels is provided by the addition of lateral cables through said panels.

6. The weighing device of claim 1 wherein additional lateral prestressing in said panels is provided by the addition of lateral rods through said panels.

* * * * *